United States Patent
Chen

(10) Patent No.: US 8,740,044 B2
(45) Date of Patent: Jun. 3, 2014

(54) METHOD FOR BONDING HEAT-CONDUCTING SUBSTRATE AND METAL LAYER

(71) Applicant: Chien-Ming Chen, Hsinchu County (TW)

(72) Inventor: Chien-Ming Chen, Hsinchu County (TW)

(73) Assignee: Subtron Technology Co., Ltd., Hsinchu County (TW)

( * ) Notice: Subject to any disclaimer, the term of this patent is extended or adjusted under 35 U.S.C. 154(b) by 0 days.

(21) Appl. No.: 13/786,480

(22) Filed: Mar. 6, 2013

(65) Prior Publication Data
US 2014/0096884 A1    Apr. 10, 2014

(30) Foreign Application Priority Data
Oct. 5, 2012   (TW) .............................. 101136943 A

(51) Int. Cl.
*B23K 31/02*       (2006.01)
*B22F 3/10*        (2006.01)

(52) U.S. Cl.
USPC .................. 228/122.1; 228/175; 228/248.1; 156/60; 419/8; 419/10; 419/19; 419/21

(58) Field of Classification Search
None
See application file for complete search history.

(56) References Cited

U.S. PATENT DOCUMENTS

| | | | | |
|---|---|---|---|---|
| 3,403,043 A | * | 9/1968 | Thompson | 428/560 |
| 4,678,633 A | * | 7/1987 | Osaki et al. | 419/8 |
| 4,763,828 A | * | 8/1988 | Fukaya et al. | 228/124.1 |
| 4,863,683 A | * | 9/1989 | Nakatani et al. | 419/10 |
| 5,082,163 A | * | 1/1992 | Kanahara et al. | 228/124.1 |
| 5,108,026 A | * | 4/1992 | Su et al. | 228/122.1 |
| 5,288,351 A | * | 2/1994 | Hoang et al. | 156/89.14 |
| 5,551,626 A | * | 9/1996 | Hasegawa et al. | 228/179.1 |
| 5,586,714 A | * | 12/1996 | Curicuta et al. | 228/122.1 |
| 5,882,723 A | * | 3/1999 | Tsou | 427/125 |
| 6,745,930 B2 | * | 6/2004 | Schmitt | 228/122.1 |
| 6,757,963 B2 | * | 7/2004 | Meier et al. | 29/610.1 |
| 6,769,598 B2 | * | 8/2004 | Miyake et al. | 228/180.21 |
| 6,881,278 B2 | * | 4/2005 | Amita et al. | 148/23 |
| 7,963,435 B2 | * | 6/2011 | Sato et al. | 228/225 |
| 8,002,166 B2 | * | 8/2011 | Nielsen et al. | 228/122.1 |
| 8,232,232 B2 | * | 7/2012 | Kakimoto | 505/511 |
| 8,444,045 B2 | * | 5/2013 | Baker | 228/233.1 |
| 8,486,328 B2 | * | 7/2013 | Ohmori et al. | 419/23 |
| 2003/0132270 A1 | * | 7/2003 | Weil et al. | 228/122.1 |
| 2004/0118679 A1 | * | 6/2004 | Taniguchi et al. | 204/298.12 |
| 2007/0221712 A1 | * | 9/2007 | Matsumoto et al. | 228/248.1 |
| 2009/0162557 A1 | * | 6/2009 | Lu et al. | 427/383.3 |
| 2009/0183825 A1 | * | 7/2009 | Sato et al. | 156/273.3 |
| 2009/0215630 A1 | * | 8/2009 | Kakimoto | 505/234 |
| 2009/0236404 A1 | * | 9/2009 | Yamakawa et al. | 228/123.1 |
| 2009/0301606 A1 | * | 12/2009 | Ueshima | 148/24 |
| 2010/0186999 A1 | * | 7/2010 | Kuramoto et al. | 174/257 |
| 2010/0270515 A1 | * | 10/2010 | Yasuda et al. | 252/514 |
| 2011/0284265 A1 | * | 11/2011 | Sakai et al. | 174/126.1 |
| 2012/0211549 A1 | * | 8/2012 | Yamakami et al. | 228/256 |
| 2013/0160895 A1 | * | 6/2013 | Liang et al. | 148/24 |
| 2013/0199673 A1 | * | 8/2013 | Yanson et al. | 148/24 |

\* cited by examiner

*Primary Examiner* — Kiley Stoner
(74) *Attorney, Agent, or Firm* — Jianq Chyun IP Office

(57) ABSTRACT

A method for bonding a heat-conducting substrate and a metal layer is provided. A heat-conducting substrate, a first metal layer and a preformed layer are provided. The preformed layer is between the heat-conducting substrate and the first metal layer. The preformed layer is a second metal layer or a metal oxide layer. A heating process is performed to the preformed layer in an oxygen-free atmosphere to convert the preformed layer to a bonding layer for bonding the heat-conducting substrate and the first metal layer. The temperature of the heating process is less than or equal to 300° C.

9 Claims, 2 Drawing Sheets

METHOD FOR BONDING HEAT-CONDUCTING SUBSTRATE AND METAL LAYER

CROSS-REFERENCE TO RELATED APPLICATION

This application claims the priority benefit of Taiwan application serial no. 101136943, filed on Oct. 5, 2012. The entirety of the above-mentioned patent application is hereby incorporated by reference herein and made a part of this specification.

BACKGROUND

1. Field of Invention

The invention relates to a bonding method, and more particularly, to a method for bonding a heat-conducting substrate and a metal layer.

2. Description of Related Art

The current bonding technology, for the purpose of heat conduction, utilizes a heat-conducting adhesive to bond two components to simultaneously achieve structural connection and heat-conducting connection. Moreover, to improve effects of heat conduction, a solder may also be used for bonding.

With the advancement of technology, the effectiveness of electronic devices is ever increasing, resulting in ever increasing heat. Therefore, in order to prevent a malfunction of an electronic device due to high temperature, the electronic device has to be connected to a radiator for quickly transferring the heat generated therein to the radiator.

However, thermal conductivity of the heat-conducting adhesive or solder can no longer satisfy the current demand for high heat-conducting efficiency. The heat-conducting adhesive or solder can no longer satisfy the heat dissipation requirements of a light emitting diode (LED).

SUMMARY

The invention is directed to a method for bonding a heat-conducting substrate and a metal layer, to bond a heat-conducting substrate and a metal layer.

The invention provides a method for bonding a heat-conducting substrate and a metal layer. First, a heat-conducting substrate, a first metal layer and a preformed layer are provided, wherein the preformed layer is between the heat-conducting substrate and the first metal layer. The preformed layer is a second metal layer or a metal oxide layer. Then, a heating process is performed to the preformed layer in an oxygen-free atmosphere to convert the preformed layer to a bonding layer to bond the heat-conducting substrate and the first metal layer. The temperature of the heating process is less than or equal to 300° C.

Based on the above, the invention performs the heating process to the preformed layer between the heat-conducting substrate and the first metal layer in the oxygen-free atmosphere to convert the preformed layer to the bonding layer in order to bond the heat-conducting substrate and the first metal layer. Since the invention only heats the preformed layer at the temperature of less than or equal to 300° C., the other devices are prevented from high temperature damage.

To make the above characteristics and advantages of the invention more easily understood, embodiments accompanied with figures are described in detail below.

DESCRIPTION OF EMBODIMENTS

Figure 1A:
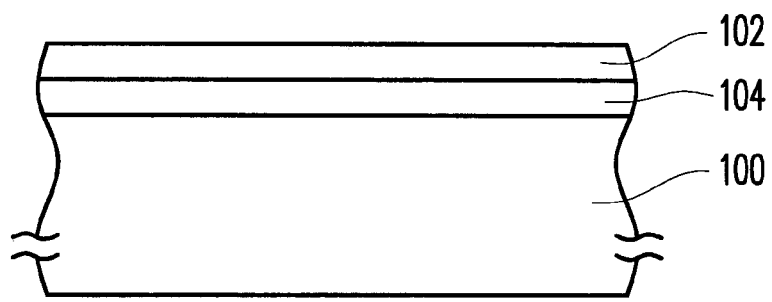
FIG. 1A to FIG. 1B are cross-sectional views illustrating a process of bonding a heat-conducting substrate and a metal layer according to an embodiment of the invention.
Figure 1B:
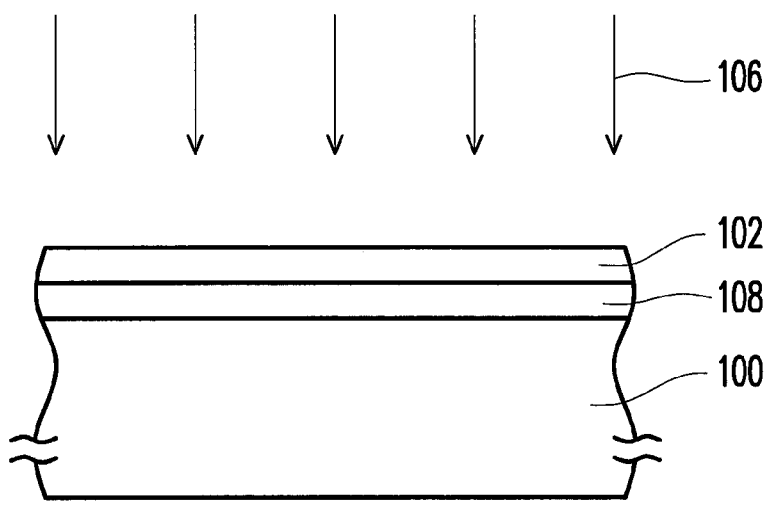

FIG. 1A to FIG. 1B are cross-sectional views illustrating a process of bonding a heat-conducting substrate and a metal layer according to an embodiment of the invention. First, referring to FIG. 1A, a heat-conducting substrate 100, a metal layer 102 and a preformed layer 104 are provided. A material of the heat-conducting substrate 100 is, for instance, a metal or an alloy, such as copper, copper alloy, aluminum or aluminum alloy. Or, the heat-conducting substrate 100 may be a ceramic substrate having a metal surface. A material of the metal layer 102 is, for instance, copper, nickel, silver or gold. After the metal layer 102 is bonded to the metal heat-conducting substrate or to the metal surface of the ceramic substrate, the heat-conducting substrate 100 is used to conduct the heat from the metal layer 102 to outside, and that is, the heat-conducting substrate 100 acts as a radiator.

The preformed layer 104 is located between the heat-conducting substrate 100 and the metal layer 102. In an embodiment, the preformed layer 104 is first formed on the heat-conducting substrate 100, and then the heat-conducting substrate 100 and the metal layer 102 are stacked, so that the preformed layer 104 is disposed between the heat-conducting substrate 100 and the metal layer 102. In another embodiment, the preformed layer 104 may be first formed on the metal layer 102, followed by stacking the heat-conducting substrate 100 and the metal layer 102.

The preformed layer 104 may be a metal layer. In an embodiment, a material of the metal layer is, for instance, silver or copper, and a formation method thereof is, for instance, electroplating by which a layer of metal material is plated on the heat-conducting substrate 100 or the metal layer 102.

Or, in another embodiment, the metal layer may be an adhesive layer containing a plurality of metal particles. A material of the metal particles is, for instance, silver, copper or a combination thereof, and a particle diameter of the metal particles is in the range between, for instance, 5 nanometers and 50 nanometers. In this case, the formation method of the metal layer is, for example, coating the adhesive layer containing metal particles on the heat-conducting substrate 100 or the metal layer 102.

In addition, the preformed layer 104 may be a metal oxide layer. In an embodiment, the metal oxide layer is a silver oxide layer or a copper oxide layer, and a formation method thereof is, for instance, electroless plating. For example, when the desired metal oxide layer is a silver oxide layer, the heat-conducting substrate 100 is placed in a silver nitrate solution to perform a chemical reaction to let the silver nitrate react and form into silver oxide on a surface of the heat-conducting substrate 100.

In another embodiment, the metal oxide layer may be an adhesive layer containing a plurality of metal oxide particles. A material of the metal oxide particles is, for instance, silver oxide or copper oxide. In this case, a formation method of the metal oxide layer is, for instance, coating the adhesive layer containing metal oxide particles on the heat-conducting substrate 100 or the metal layer 102.

Then, referring to FIG. 1B, a heating process 106 is performed to the preformed layer 104 in an oxygen-free atmosphere, so as to convert the preformed layer 104 to a bonding layer 108 to bond the heat-conducting substrate 100 and the metal layer 102. The oxygen-free atmosphere is an inert gas atmosphere or a reducing gas atmosphere. The inert gas is, for instance, nitrogen or argon. The reducing gas is, for instance, hydrogen or hydrogen-containing gas. In addition, the temperature of the heating process 106 is less than or equal to 300° C.

It is worth mentioning that since the temperature of the heating process 106 is less than or equal to 300° C., which is far less than the melting point of the preformed layer 104 (metal layer or metal oxide layer), which means that the heat-conducting substrate 100 and the metal layer 102 are bonded at a lower temperature, a problem that the other devices may be damaged due to high temperature is avoided. In addition, since the material for bonding the heat-conducting substrate 100 and the metal layer 102 is a metal or a metal oxide, which has good heat conduction characteristics, it effectively conducts the heat from the metal layer 102 to the heat-conducting substrate 100 to dissipate, thus simultaneously achieving the goals of structure bonding and heat conduction.

The examples below explain a structure formed by the method of bonding the heat-conducting substrate and the metal layer in the invention.

Figure 2:
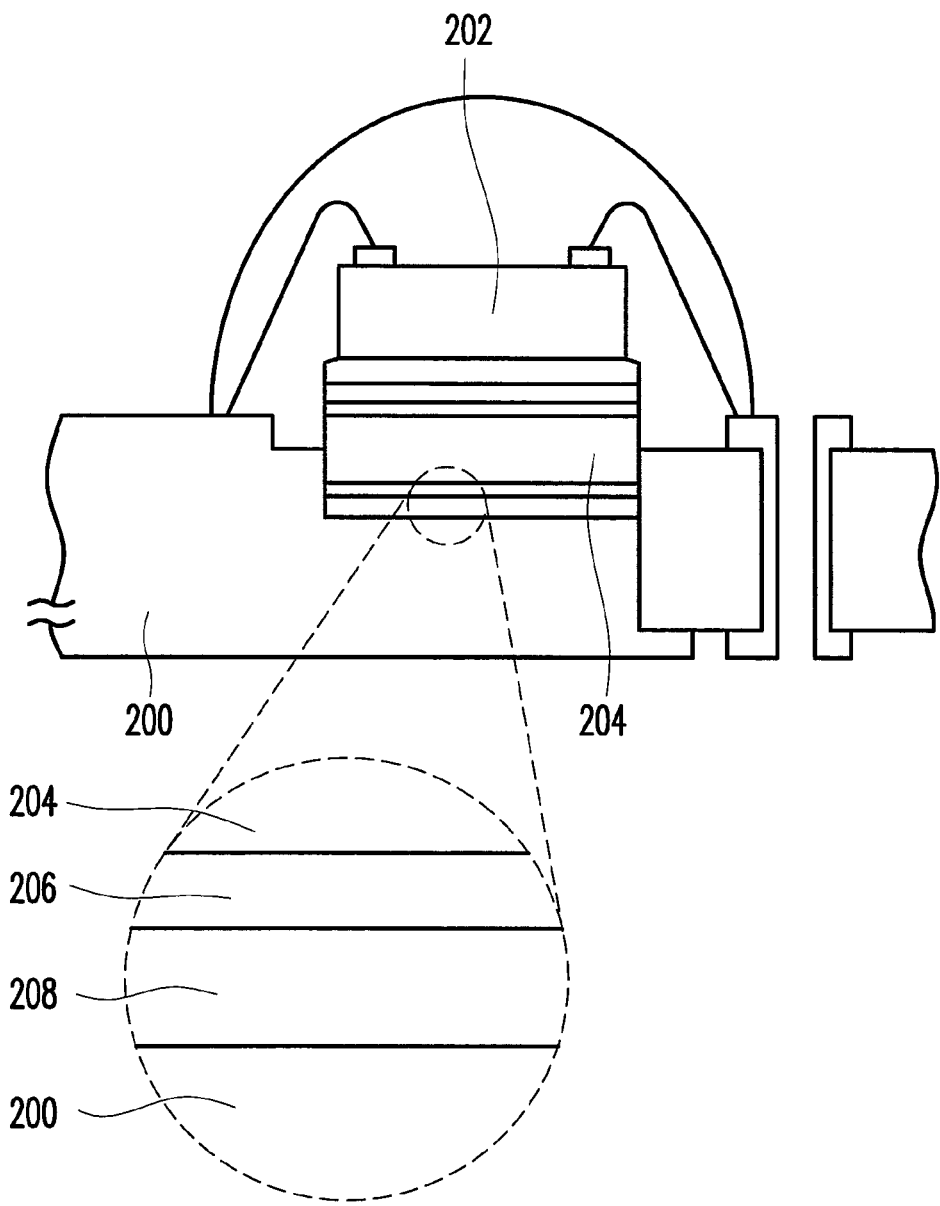
FIG. 2 is a schematic cross-sectional view illustrating a structure of a chip disposed on a heat-conducting substrate according to an embodiment of the invention.

FIG. 2 is a schematic cross-sectional view illustrating a structure of a chip disposed on a heat-conducting substrate according to an embodiment of the invention. Referring to FIG. 2, a chip 202 is mounted on a stacking structure containing a ceramic layer 204. A material of the ceramic layer 204 is, for instance, aluminum oxide, boron nitride, aluminum nitride, silicon carbide, etc. A surface of the ceramic layer 204 has a copper layer 206. The copper layer 206 is the first metal layer of the invention.

In addition, the stacking structure is mounted on a heat-conducting substrate 200 that acts as a radiator. A material of the heat-conducting substrate 200 is, for instance, a metal or an alloy, or a ceramic substrate having a metal surface. A bonding layer 208 is disposed between the heat-conducting substrate 200 and the copper layer 206 to bond the heat-conducting substrate 200 and the copper layer 206. The bonding layer 208 is converted from the preformed layer 104 according to the method described in FIG. 1A to FIG. 1B.

It is known from the above that during a heating process for bonding the heat-conducting substrate 200 and the copper layer 206, the temperature is less than or equal to 300° C., which is far less than the melting point of the metal or the metal oxide, which means that the heat-conducting substrate 200 and the copper layer 206 are bonded at a lower temperature, thus the problem that the other components may be damaged due to high temperature is avoided.

In addition, since the bonding layer 208 is a metal or a metal oxide, which has good heat conducting characteristics, it effectively conducts the heat generated from the chip 202 to the heat-conducting substrate 200 to dissipate.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A method for bonding a heat-conducting substrate and a metal layer, comprising:
   providing a heat-conducting substrate, a metal layer and a preformed layer, wherein the preformed layer is located between the heat-conducting substrate and the metal layer, and the preformed layer is an adhesive layer containing a plurality of metal oxide particles; and
   performing a heating process to the preformed layer in an oxygen-free atmosphere, to convert the preformed layer to a bonding layer to bond the heat-conducting substrate and the metal layer, wherein the temperature of the heating process is less than or equal to 300° C.

2. The method for bonding a heat-conducting substrate and a metal layer of claim 1, wherein after the preformed layer is formed on the heat-conducting layer or the metal layer, the heat-conducting layer and the metal layer are stacked to dispose the preformed layer between the heat-conducting layer and the metal layer.

3. The method for bonding a heat-conducting substrate and a metal layer of claim 1, wherein the materials of the metal oxide particles comprise silver oxide or copper oxide.

4. The method for bonding a heat-conducting substrate and a metal layer of claim 1, wherein the formation of the preformed layer comprises coating.

5. The method for bonding a heat-conducting substrate and a metal layer of claim 1, wherein materials of the heat-conducting substrate comprise a metal or an alloy.

6. The method for bonding a heat-conducting substrate and a metal layer of claim 1, wherein the heat-conducting substrate comprises a ceramic substrate having a metal surface, and the metal layer is bonded to the metal surface via the bonding layer.

7. The method for bonding a heat-conducting substrate and a metal layer of claim 1, wherein the oxygen-free atmosphere comprises an inert gas atmosphere or a reducing gas atmosphere.

8. The method for bonding a heat-conducting substrate and a metal layer of claim 7, wherein the inert gas comprises nitrogen or argon.

9. The method for bonding a heat-conducting substrate and a metal layer of claim 7, wherein the reducing gas comprises hydrogen or hydrogen-containing gas.

* * * * *